United States Patent [19]
Emmons et al.

[11] 3,862,644
[45] Jan. 28, 1975

[54] FLOW CONTROL

[75] Inventors: Floyd R. Emmons, Simsbury;
George C. Rannenberg, Canton, both of Conn.

[73] Assignee: United Aircraft Corporation, East Hartford, Conn.

[22] Filed: July 12, 1973

[21] Appl. No.: 378,475

[52] U.S. Cl. ............................................. 137/486
[51] Int. Cl. ........................................ F16k 31/145
[58] Field of Search .................................... 137/486

[56] References Cited
UNITED STATES PATENTS

| | | | |
|---|---|---|---|
| 2,266,533 | 12/1941 | Brisbane et al. | 137/486 X |
| 2,630,132 | 3/1953 | Hughes | 137/486 |
| 2,731,974 | 1/1956 | Krueger | 137/486 X |
| 2,868,225 | 1/1959 | Wigham et al. | 137/486 X |

*Primary Examiner*—Henry T. Klinksiek
*Attorney, Agent, or Firm*—Norman Friedland

[57] ABSTRACT

The accuracy of a flow control for a compressible fluid, where the static and throat pressures of a venturi are sensed, is improved upon by judiciously locating the point at which the force generated by the sensed pressure is applied and/or selecting the respective forces generated by the sensing mechanisms for a given sensed pressure. When diaphragms are utilized the area of the diaphragms or the moment arm are judiciously selected for applying the forces to a fulcrum lever or just the area may be judiciously selected in an in-line arrangement in order to obtain a substantially constant flow schedule over a given pressure range.

6 Claims, 4 Drawing Figures

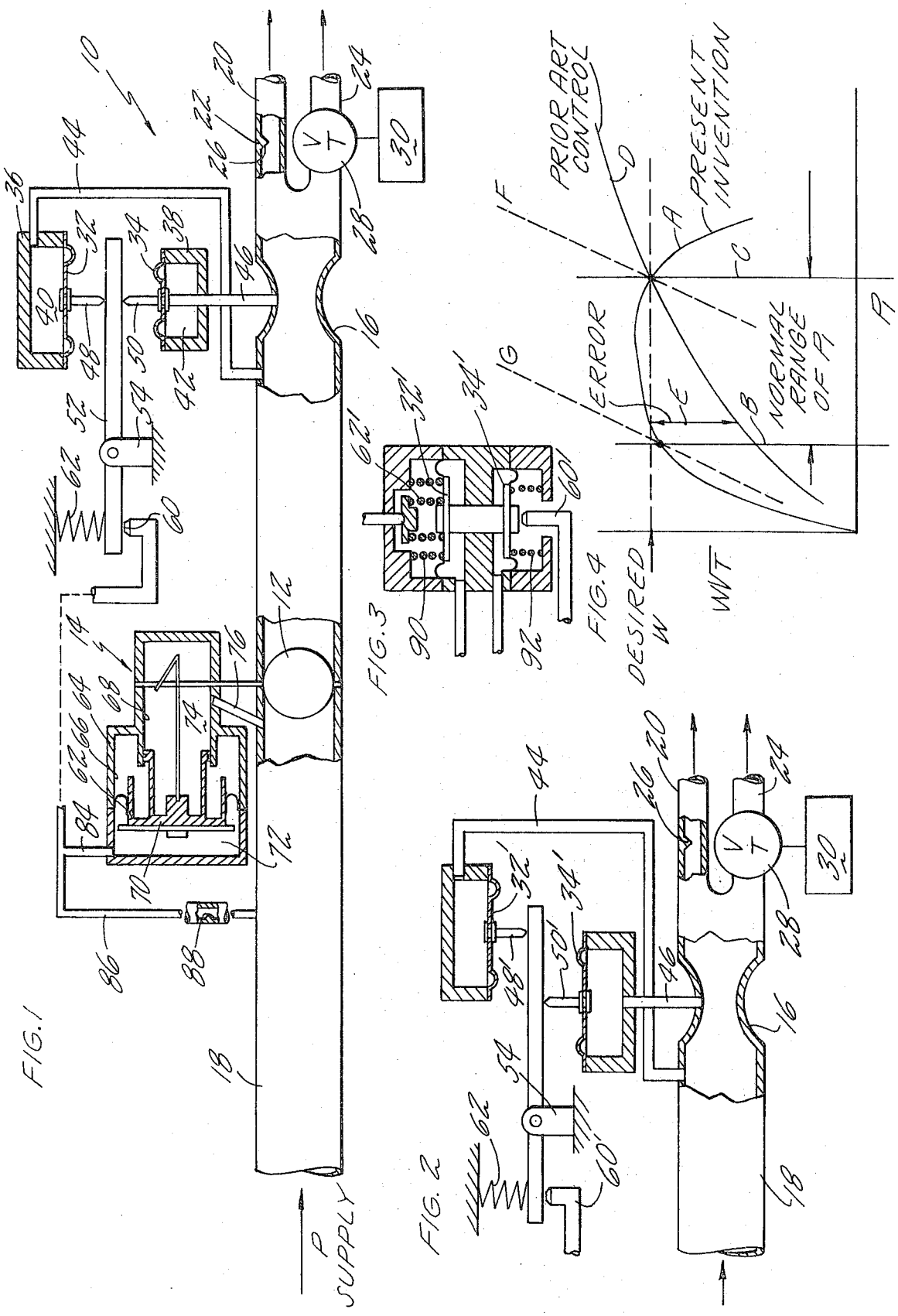

FLOW CONTROL

BACKGROUND OF THE INVENTION

This invention relates to flow controls and more particularly to a flow for maintaining a constant weight flow of a compressible fluid.

It is customary in a flow control to sense either the pressure drop across a fixed restrictor or the upstream and throat pressures of a venturi and compute these signals to obtain output whose value is indicative of the differential thereof. The customary heretofore known practice is to utilize force producing bellows or diaphragms and mount them in opposing relation to obtain a true $\Delta P$ signal. A $\Delta P$ controller of this type, as is well understood, does not hold a constant weight flow and in fact, the control value of airflow varies with the square root of pressure through the restriction or venturi. The standard flow equation exemplifying this condition and which expresses the relationship in the heretofore known flow controls is as follows:

$$W \sqrt{T} = \sqrt{P_1 K_1/K_2}$$ (The list of symbols appears at the end of the specification)

Thus the control value of airflow varies with the square root of pressure of the venturi, which makes for an inaccurate control particularly where a constant flow is desired. As is generally well known in the flow controls used in aircraft air-conditioning system these inherent errors noted above are always present. This is occasioned by the fact that the modulating valve(s) which adjust the airflow into the cabins/compartments and the like have the effect of changing the pressure level in the venturi whenever they are modulated. The consequence of this pressure level change in the venturi has an adverse effect on the flow control and introduces errors in the system.

I have found that I can obviate the problem noted above by judiciously locating the sensing diaphragms or sizing the areas thereof which when applied to a control system will cause the control to be sensitive to the pressure level of the upstream or total pressure as well as the customary $\Delta P$ or differential pressure signal and therefore affords an essentially constant flow schedule over a given range of pressure. This differs from the heretofore known conventional control system that merely senses the $\Delta P$ pressure.

SUMMARY OF THE INVENTION

An object of this invention is to provide an improved flow control.

A still further object of this invention is to provide an improved flow controller for a compressible fluid whose pressure varies over a substantially wide range and which is of the type that measures the pressures upstream and at the throat of a Venturi or the pressure drop across the fixed restriction and applying that pressure to force generating mechanism where the flow characteristics of the venturi or restrictor is enhanced by judiciously selecting either the moment arms on a forced balanced fulcrum lever of a servo actuating system, or the force level generated by each sensing mechanism such that the control is sensitive to the level of total pressure as well as the difference between total and static pressure.

A still further object of this invention is to provide a flow controller for a compressible fluid wherein the pressure at the throat and upstream of the venturi is used as a sensed signal and by judiciously locating the force generating mechanism or selecting the areas thereof in accordance with the formula (without correcting for compressibility):

$$W \sqrt{T} = \sqrt{P_1 K_1 L_1 A_1/K_2 L_2 A_2 - P_1 (P_1 - P_a)/K_2(L_1 A_1/L_2 A_2 - 1)}$$

Other features and advantages will be apparent from the specification and claims and from the accompanying drawings which illustrate an embodiment of the invention.

BRIEF DESCRIPTION OF THE DRAWINGS

FIG. 1 is a schematic view partly in section illustrating the details of this invention.

FIG. 2 is a fragmentary view in schematic and partly in section illustrating a second embodiment of this invention.

FIG. 3 is a sectional view showing still another embodiment of this invention, and FIG. 4 is a graphical representation showing a plot of the flow at a given temperature versus pressure and illustrating a typical prior art control in comparison to the present invention.

DESCRIPTION OF THE PREFERRED EMBODIMENT

Reference is now made to FIG. 1 which comprises the flow control generally illustrated by reference numeral 10 which serves to maintain the flow downstream of the butterfly valve 12 at a substantially constant value, actuator 14 and venturi 16 disposed in the flow line 18. This embodiment exemplifies an air-conditioning system for aircraft, where the turbine power plant is the source of air and the flow is divided in the bifurcated section 20 into a pair of downstream duct lines 22 and 24. The fixed restriction 26 disposed in duct line 22 may be representative of the stator vane of the turbine (not shown) which is continuously exposed to the supply pressure and valve 28 disposed in the branch line 24 in the bifurcated section is representative of the numerous downstream valves in the system which may be modulated automatically or mechanically to vary the air supply, for example, in the aircraft cabin and/or compartments. Actuator 30 shown in blank is any suitable actuator that serves to vary the area of the metering valve 28.

It is to be understood as will be obvious to one ordinarily skilled in the art that while this invention is described utilizing a venturi to sense the flow in duct 18, measurement of the pressure drop across a fixed restriction may serve the same purpose. Additionally, while the venturi is mounted downstream of the butterfly valve in this embodiment and this is the preferred design whenever the pressure in the supply line varies over a substantially large range, it is also to be understood that the venturi may be mounted upstream of the butterfly in a situation where the pressure in the supply line does not vary so extensively.

Flow in duct 18 downstream of butterfly 12 is sensed by diaphragm 32 which is in communication with the static pressure upstream of venturi 16 and diaphragm 34 which is in communication with the static pressure at the throat of the venturi 16. Diaphragms 32 and 34 are suitably supported to casings 36 and 38 respectively and form a movable wall thereof. As noted from FIG. 1 each casing provides a variable volume chamber 40 and 42 which are directly in communication with the pressure in venturi 16 via lines 44 and 46 respectively. Diaphragms 32 and 34 support plungers 48 and 50 respectfully which bear against fulcrum lever 52 pivotally supported to pivot 54. Lever 52 is part of the force balance system for the servo system which serves to position actuator 14. This is accomplished by balancing the force with relationship to the jet nozzle 60 for establishing its curtain area. Thus the moment arms created by the forces generated by diaphragms 32 and 34 are balanced by the opposing compression spring 62 which may be mechanically or automatically adjustable with relationship to the jet nozzle 60 for establishing the null position.

In this way butterfly valve 12 is varied by actuator 14 which is substantially a half area servo for varying the flow in duct 18 in accordance with the schedule selected by the sensing mechanism. Half area servo actuator 14 comprises diaphragm 62 supported within casing 64 having a larger diameter cavity 66 and a reduced diameter cavity 68. The diaphragm 62 is centrally supported by supporting mechanism 70 in any suitable manner, and divides casing 64 into separate compartments 72 and 74. It will be noted that diaphragms 62 sees the pressure in compartment 74 on the right side and sees the pressure in compartment 72 on its left side and since the area on the right side is half the area on the left side half the pressure is necessary to hold it in the fixed position. It being noted that pressure upstream of butterfly 12 is admitted into chamber 74 via connection 76 and pressure on the left side of diaphragm 64 in chamber 72 is in communication with pressure upstream of butterfly valve via branch line 84 communicating with line 86. The pressure in chamber 72 is modulated by varying the pressure drop across fixed restriction 88 by opening and closing the jet nozzle 60 by virtue of the fulcrum lever 52. It should be noted that the half area servo type actuator used in this embodiment is well suited to the flow controller of this invention; other conventional servo actuator types may also be used.

Thus it is apparent that the curtain area established by fulcrum lever 52 serves to establish the pressure in chamber 72 and hence position diaphragm 62 and by virtue of the connection linkage positions butterfly 12 for establishing the metering area. It is further noted that should there occur a change in flow as evidenced by the sensing diaphragms 32 and 34 the fulcrum lever will pivot about its pivot point to change the area to either an increase or reduced value which in turn varies the pressure drop across fixed restriction 88 and consequently pressure in chamber 72. This pressure change moves diaphragm 62 to cause a movement of butterfly 12 to rectify the change of flow to maintain a substantially constant flow in duct 18.

In accordance with this invention it will be noted that the area of diaphragm 34 is smaller than the area diaphragm 32. The purpose of varying the area is to preestablish the force level generated by these sensing devices which in this instance are these sensing diaphragms.

Although a rigorous mathematical analysis can show the validity of this equation, the following is a simplified derivation:

A force balance of flow controller 10 yields the following in the balanced condition:

$$P_1 - P_2 = K_1 A_1/A_2 - (P_1 - P_a)(L_1 A_1/L_2 A_2 - 1)$$

1.

The approximate characteristics of a venturi, in the nonchoking region:

$$P_1 - P_2 = K_2 W^2 T/P_1$$

2.

Combining Eq 1 and 2: $W$ $$\sqrt{T} = \frac{}{\sqrt{P_1 K_1 L_1 A_1 / K_2 L_2 A_2 - P_1 (P_1 - P_a)/K_2 (L_1 A_1/L_2 A_2 - 1)}}$$

A more generalized and simplified form of the equation 10 is as follows:

$$W \sqrt{T} = \sqrt{P_1 C_1 - P_1(P_1 - P_a) C_2}$$

It can be seen that the primary difference between the equation governing the flow in the invention and the equation governing the flow in a conventional flow control 10 the added term which expreses the influence of the $P_1$ pressure.

By virtue of this influence of the $P_1$ pressure the control provides a more constant flow schedule over a given range of pressures.

Plotting the weight flow versus the pressure upstream of the venturi as noted in FIG. 4, this inventive concept provides the curve illustrated by reference letter A. Line F represents the operating line of the system downstream of 16, with valve 28 full shut. Line G represents the operating line of the system downstream of venturi 16 with valve 28 full open. Between lines B and C which is thus a typical range of possible operating pressures for a given aircraft air-conditioning system, it will be noted that the top of curve A is substantially flat and constant. Thus by selecting the force levels and designing the system to operate within this pressure range it is apparent that the desired weight flow throughout this range of pressure would remain at a substantially constant value. This compares with a typical flow control system represented by curve D which has a substantial error as noted by the arrow E at the low end of the range. It is apparent from the froegoing that the invention contemplates utilizing a value of the pressure level so as to provide a control that essentially produces a P + ΔP signal.

$C_1$ = constant indicative of fluid properties and mechanical arrangement $C_2$ = constant indicative of mechanical arrangement whereby said control means positions said metering valve for maintaining a substantially constant weight flow of the compressible fluid.

FIGS. 2 and 3 represents species of this invention which provide identical results but differ merely in its execution. (The Primed reference numeral in these figures correspond to the unprimed reference numerals in FIG. 1). As noted in FIG. 2 diaphragm 32' is equal to the area of diaphragm 34' but the plungers 48' and 50' are judiciously spaced relative to the pivot of fulcrum lever 54. Thus, rather than changing the areas of the diaphragms, the moment arms in this instance are changed.

In FIG. 3 diaphragm 34' is made smaller than diaphragm 32' but in this instance the jet nozzle 60' is at the end of the sensing mechanism rather than being disposed in the middle thereof as is the case in FIG. 1. Note that in this instance the adjusting spring 62' is concentric to balancing spring 90. A second balancing spring 92 may also be necessary in this embodiment.

It is also contemplated within the scope of this invention to compensate the system for altitude changes, if this is an important design criteria. In this event the diaphragms would be replaced by bellows and one of the bellows would be evacuated. The bellows and fulcrumed lever as shown in FIG. 1 would be encapsulated in an enclosed chamber where upstream venturi pressure would be admitted into the chamber to surround the bellows and internally of the other bellows would be in communication with venturi throat pressure.

What has been described in this invention is a simple yet novel way in which to obtain an accurate flow control for a compressible fluid by designing the flow control to operate within a given pressure range and fall within the formula expressed by the following equation:

$$W \sqrt{T} = \sqrt{P_1 K_1 L_1 A_1 / K_2 L_2 A_2 - P_1 (P_1 - P_a)/K_2 (L_1 A_1/L_2 A_2 - 1)}$$

LIST OF SYMBOLS subscript 1 = upstream of venturi (or restriction) unless indicated otherwise subscript 2 = throat of venturi (or restriction) unless indicated otherwise A = area in square inches
L = length from pivot
W = weight flow of fluid in lbs/min.
$P_1$ = pressure in pounds per square inch absolute (psia)
$P_a$ = ambient pressure absolute (psia) surrounding the flow control
T = absolute temperature in degrees Rankine
$L_1 A_1$ = moment arm of sensed pressure upstream of venturi
$L_2 A_2$ = moment arm of sensed pressure at throat of venturi where $K_1$ is a mechanical design constant where $K_2$ is defined by the properties of the fluid and the venturi area.

We claim:

1. A flow control for a compressible fluid having a restriction disposed in a flow line and a metering valve also disposed in said flow line for adjusting the flow therein in response to said flow control, said flow control including sensing means for measuring the pressure in proximity to said restriction, control means responding to said sensing means operatively connected to said metering valve, said sensing means comprised of a pair of force producing elements arranged to produce a differential force signal in accordance with the following equation:

$$W \sqrt{T} = \sqrt{P_1 C_1 - P_1(P_1 - P_a)C_2}$$

W = weight flow of controlled fluid
T = absolute temperature in degrees Rankine
$P_1$ = pressure in pounds per square inch absolute (psia) of fluid upstream of flow restriction or
$P_a$ = total pressure absolute (psia) surrounding the flow control
$C_1$ = constant indicative of fluid properties and mechanical arrangement
$C_2$ = constant indicative of mechanical arrangement whereby said control means positions said metering valve for maintaining a substantially constant weight flow of the compressible fluid.

2. A flow control as claimed in claim 1 wherein said restriction is a venturi.

3. A flow control as claimed in claim 1 wherein said restriction is downstream of said metering valve.

4. A flow control as claimed in claim 1 wherein said force producing elements include diaphragms.

5. A flow control for compressible fluid for maintaining a substantially constant weight flow over a given pressure range including a venturi disposed in a duct and a metering valve disposed in said duct upstream of said venturi, a servo system including an actuator for positioning said metering valve and a forced balanced lever, a pair of disphragms one communicating with static pressure at the throat of said venturi and the other communicating with the static pressure immediately upstream of said venturi, said forced balanced lever being subjected to the forces generated by said diaphragms to control said actuator and position said metering valve as a function of the sensed pressures and said diaphragms being in opposed relation relative to the fulcrumed lever, and the area of said diaphragm in communication with said throat pressure being smaller than the area of the other diaphragm.

6. A flow control as claimed in claim 5 wherein said diaphragms are substantially equal area but the diaphragm subjected to throat pressure being spaced closer to the fulcrum point of said fulcrumed lever than the other diaphragm.

* * * * *